United States Patent
Konishi

(10) Patent No.: US 8,159,538 B2
(45) Date of Patent: Apr. 17, 2012

(54) MONITORING APPARATUS, FILTER CALIBRATION METHOD, AND FILTER CALIBRATION PROGRAM

(75) Inventor: Tetsuya Konishi, Tokyo (JP)

(73) Assignee: Sony Corporation, Tokyo (JP)

( * ) Notice: Subject to any disclaimer, the term of this patent is extended or adjusted under 35 U.S.C. 154(b) by 1305 days.

(21) Appl. No.: 11/780,953

(22) Filed: Jul. 20, 2007

(65) Prior Publication Data

US 2008/0024609 A1 Jan. 31, 2008

(30) Foreign Application Priority Data

Jul. 27, 2006 (JP) ................ P2006-205068

(51) Int. Cl.
*H04N 7/18* (2006.01)
(52) U.S. Cl. ........................................ 348/159
(58) Field of Classification Search .......... 348/143, 348/152, 153, 154, 155, 159
See application file for complete search history.

(56) References Cited

U.S. PATENT DOCUMENTS

| | | | |
|---|---|---|---|
| 7,602,413 B2 * | 10/2009 | Kondo et al. ............... | 348/143 |
| 7,830,410 B2 * | 11/2010 | Kondo et al. ............... | 348/148 |
| 7,868,912 B2 * | 1/2011 | Venetianer et al. ......... | 348/143 |
| 8,055,783 B2 * | 11/2011 | Brannon, Jr. ............... | 709/231 |
| 2003/0040925 A1 * | 2/2003 | Gutta et al. ................ | 705/1 |
| 2004/0119848 A1 * | 6/2004 | Buehler ..................... | 348/239 |
| 2005/0057653 A1 * | 3/2005 | Maruya ...................... | 348/159 |
| 2005/0105765 A1 * | 5/2005 | Han et al. .................. | 382/100 |
| 2005/0132414 A1 * | 6/2005 | Bentley et al. ............. | 725/105 |
| 2005/0169367 A1 * | 8/2005 | Venetianer et al. ......... | 375/240.01 |
| 2006/0284979 A1 * | 12/2006 | Clarkson .................... | 348/143 |
| 2007/0013776 A1 * | 1/2007 | Venetianer et al. ......... | 348/143 |
| 2007/0043875 A1 * | 2/2007 | Brannon ..................... | 709/231 |
| 2008/0008360 A1 * | 1/2008 | Pattikonda ................. | 382/118 |
| 2008/0297360 A1 * | 12/2008 | Knox et al. ................ | 340/628 |

FOREIGN PATENT DOCUMENTS

JP 2003-274390 9/2003

* cited by examiner

*Primary Examiner* — Moustafa M Meky
*Assistant Examiner* — Sargon Nano
(74) *Attorney, Agent, or Firm* — Finnegan, Henderson, Farabow, Garrett & Dunner, L.L.P.

(57) ABSTRACT

A monitoring apparatus includes a filter setting unit configured to store filter setting information for analyzing the video data, a filtering unit configured to determine whether the video data satisfies a filter condition of a filter stored in the filter setting unit and, when the video data satisfies the filter condition, perform filtering in which the number of detected objects is counted and output, and a filter calibrating unit configured to perform filter calibration in which at least one virtual filter is arranged with respect to a predetermined filter or a newly set filter, filtering is performed using the predetermined filter or the newly set filter and the virtual filter, a mode of values obtained as results of the filtering is calculated, and when the mode is determined to be equal to or approximate to a true value, the virtual filter is stored as a primary filter.

18 Claims, 15 Drawing Sheets

MONITORING APPARATUS, FILTER CALIBRATION METHOD, AND FILTER CALIBRATION PROGRAM

CROSS REFERENCES TO RELATED APPLICATIONS

The present invention contains subject matter related to Japanese Patent Application JP 2006-205068 filed in the Japanese Patent Office on Jul. 27, 2006, the entire contents of which are incorporated herein by reference.

BACKGROUND OF THE INVENTION

1. Field of the Invention

The present invention relates to monitoring apparatuses which receive video data and data relating to the video data (metadata) from monitoring cameras, perform filtering on the metadata, and output results of monitoring on the basis of results of the filtering. The present invention also relates to filter calibration methods and filter calibration programs for the monitoring apparatuses.

2. Description of the Related Art

Monitoring systems having monitoring cameras and control devices which are connected to each other via networks have been used. In such monitoring systems, monitoring cameras send data of captured video images to monitoring apparatuses operating as control devices via networks. The monitoring apparatuses record the received video data and analyze the video data to detect abnormalities and output alarms. Operators of the monitoring systems can perform monitoring while checking the monitored images being displayed on a screen and the content of the alarms output from the control devices.

Recent monitoring cameras are capable of not only sending data of captured video images to monitoring apparatuses but also generating metadata relating to the video data (for example, alarm information, temperature information, angle-of-view information of cameras) and sending the metadata to the monitoring apparatuses. In monitoring systems including such monitoring cameras, the monitoring apparatus pass metadata provided by monitoring cameras through metadata filters (hereinafter referred to as filters) in which predetermined conditions for alarm output are set, so that alarms are output when the conditions are satisfied. Examples of the conditions for abnormality detection include intrusion of a suspicious object into a predetermined area and passage of a moving object across a predetermined line.

Japanese Unexamined Patent Application Publication No. 2003-274390 discloses a technique in which video data of a monitored video image is supplied from a monitoring terminal (a monitoring camera) to a monitoring apparatus via a network, and checking of a monitor image obtained at the time of occurrence of an abnormality is performed by the monitoring apparatus.

SUMMARY OF THE INVENTION

However, there may be disadvantages in performing monitoring using such a monitoring system described above. For example, when a filter configured to measure the number of objects which have passed across a predetermined line and output an alarm on the basis of the number is used, there may be an error between the number of objects that have actually passed across the predetermined line and the number of objects counted through the filter. The true number of objects may be larger than the number obtained through filtering, when a plurality of objects are recognized as one object by a monitoring camera since, for example, the objects are adjacent to each other.

In addition, when an object to be monitored is a person, the true value number of objects may be smaller than the number obtained through filtering. For example, one person may be recognized as a plurality of objects when the monitoring camera detects the movement of his or her arms and legs. Further, there may also be a case where one object is recognized as a plurality of objects when noise occurs due to an instantaneous change in brightness.

The present invention has been made in view of the above circumstances. Thus, there is a need for a technique which increases accuracy of filtering.

According to the present invention, when monitoring is performed using video data of a video image captured and output by a monitoring image pickup apparatus, filter setting information is stored in a filter setting unit, at least one virtual filter is arranged with respect to a predetermined filter read from the filter setting unit or a newly set filter, filtering is performed using the predetermined filter read from the filter setting unit or the newly set filter and the virtual filter, a mode of values obtained as results of the filtering is calculated, and when the mode is determined to be equal to or approximate to a true value to be obtained as the result of the filtering, which having been obtained beforehand, the virtual filter is stored in the filter setting unit as a primary filter.

With this arrangement, filters are newly set in addition to a predetermined filter read from the filter setting unit or a newly set filter, and by using all the filters, a value obtained through filtering can be equal to or approximate to a true value to be obtained as the result of the filtering.

According to the present invention, the accuracy of filtering is increased. Specifically, increased accuracy of the numbers obtained as the results of filtering can be obtained by calculating appropriate positions for setting filters and setting the filters at the calculated positions.

DESCRIPTION OF THE PREFERRED EMBODIMENTS

In the following, the preferred embodiments of the present invention will be described with reference to the accompanying drawings. In the following description, a case is illustrated where an embodiment is applied to a monitoring system in which an object is detected by analyzing metadata obtained by an image pickup apparatus (monitoring camera) which generates video data of a captured image of an object and metadata for the video data, and the number of detected objects is calculated.

Figure 1A:
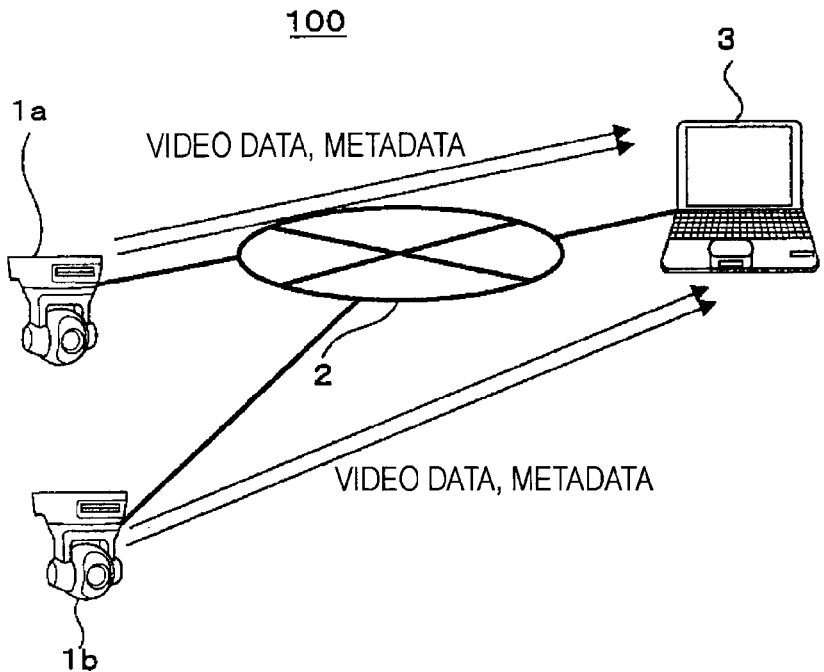
FIGS. 1A and 1B are diagrams each illustrating a configuration of a monitoring system according to an embodiment of the present invention.
Figure 1B:
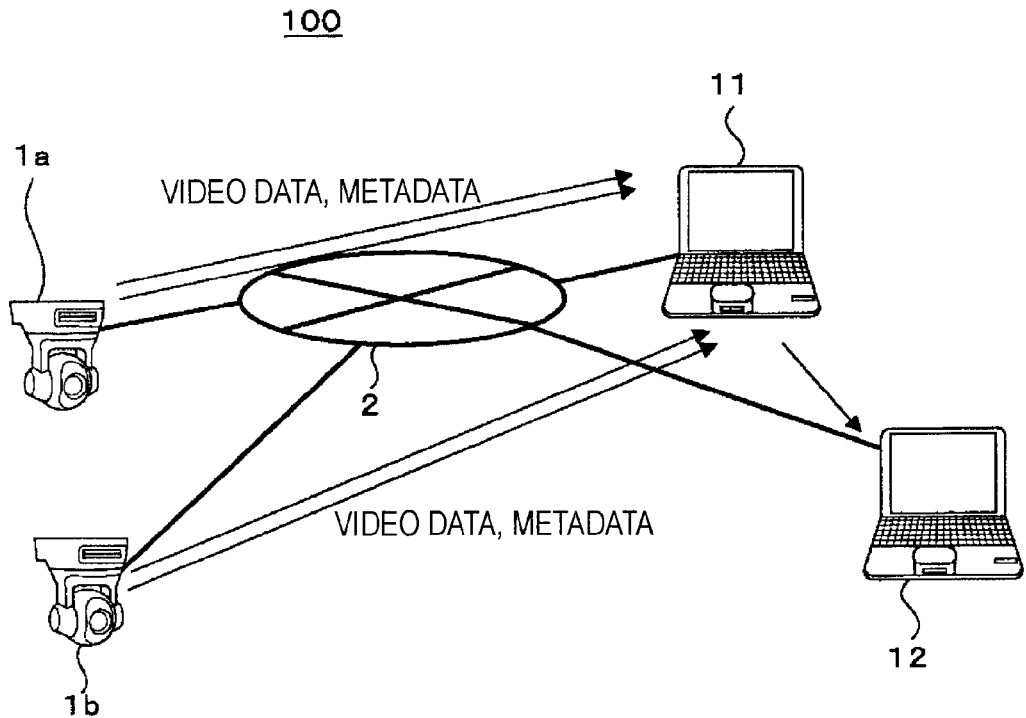

FIGS. 1A and 1B illustrate connection configurations of monitoring systems according to an embodiment of the present invention. FIG. 1A illustrates a system in which a client terminal operating as a monitoring apparatus acquires data output from a monitoring camera via a network. FIG. 1B illustrates a system in which a server acquires data output from a monitoring camera and provides the acquired data to a client terminal (server/client system).

Referring to FIG. 1A, a monitoring system 100 will be described. As illustrated in the figure, the monitoring system 100 monitors one or a plurality of monitoring cameras. In this example, the monitoring system 100 manages two monitoring cameras. The monitoring system 100 includes monitoring cameras 1a and 1b each capturing an image of an object to be monitored, generating video data, and generating metadata from the video data. The monitoring system also has a client terminal 3 which analyzes and stores the video data and the corresponding metadata and calculates the number of detected objects, and a network 2 which connects the monitoring cameras 1a and 1b to the client terminal 3. The metadata acquired by the client terminal 3 from each of the monitoring cameras 1a and 1b via the network 2 is analyzed using a metadata filter (hereinafter also referred to as a filter). The client terminal 3 supplies a switching instruction signal to each of the monitoring cameras 1a and 1b to control operations of the monitoring cameras so that an appropriate monitored image can be obtained. This switching instruction signal is supplied on the basis of a result of filtering.

Needless to say, the numbers of monitoring cameras, servers, and client terminals are not limited to the numbers indicated in the above example.

Now, metadata generated by a monitoring camera will be described. Metadata refers to attribute information on video data of a video image captured by an image pickup unit (not shown) of the monitoring camera. The followings are examples of metadata: object information (an ID, a coordinate, a size, etc. of a detected moving object); pickup time data, information on an orientation of the monitoring camera (pan, tilt, etc.); information on a position of the monitoring camera; signature information on a captured image. The object information refers to information obtained by expanding information recorded in metadata in the form of binary data into data having a meaningful structure, for example.

The metadata filter refers to conditions under which alarm information is generated from the object information. The alarm information has been filtered on the basis of the object information derived from the metadata. The alarm information can be obtained by performing processing such as analyzing metadata including a plurality of frames, calculating a velocity based on a change in a position of a moving object, and checking if the moving object has passed across a predetermined line. The alarm information can also be obtained by comprehensively analyzing the results of the above processing.

Seven examples of types of filters are described below, and any filter type can be selected from among the seven filter types. Appearance: a filter for determining whether an object is present within a predetermined area. Disappearance: a filter for determining whether an object appeared in a predetermined area and has then disappeared from the area. Passing: a filter for determining whether an object has passed across a predetermined line. Capacity: a filter for counting the number of objects which are present within a predetermined area and determining whether the cumulative number of objects exceeds a predetermined value. Loitering: a filter for determining whether an object remains within a predetermined area for longer than a predetermined time period. Unattended: a filter for determining whether a still object that intruded into a predetermined area has been presented for longer than a predetermined time period. Removed: a filter for determining whether an object that was present in a predetermined area has been removed.

Data contained in the alarm information includes, for example, the "cumulative number of objects" generated through a filter such as "Capacity" which uses a cumulative number of detected objects, the "number of objects" which is the number of the objects that satisfy a filter condition, the "number of objects" which is a number of objects in a specific frame that satisfy a condition set in a filter (filter condition), and "attribute information" on an object that satisfies a filter condition (an ID, an X coordinate, a Y coordinate, a size of the object, etc.). The alarm information also contains the number of persons who are present in a video image and statistics on the number of persons and can also be used as report information.

Figure 2:
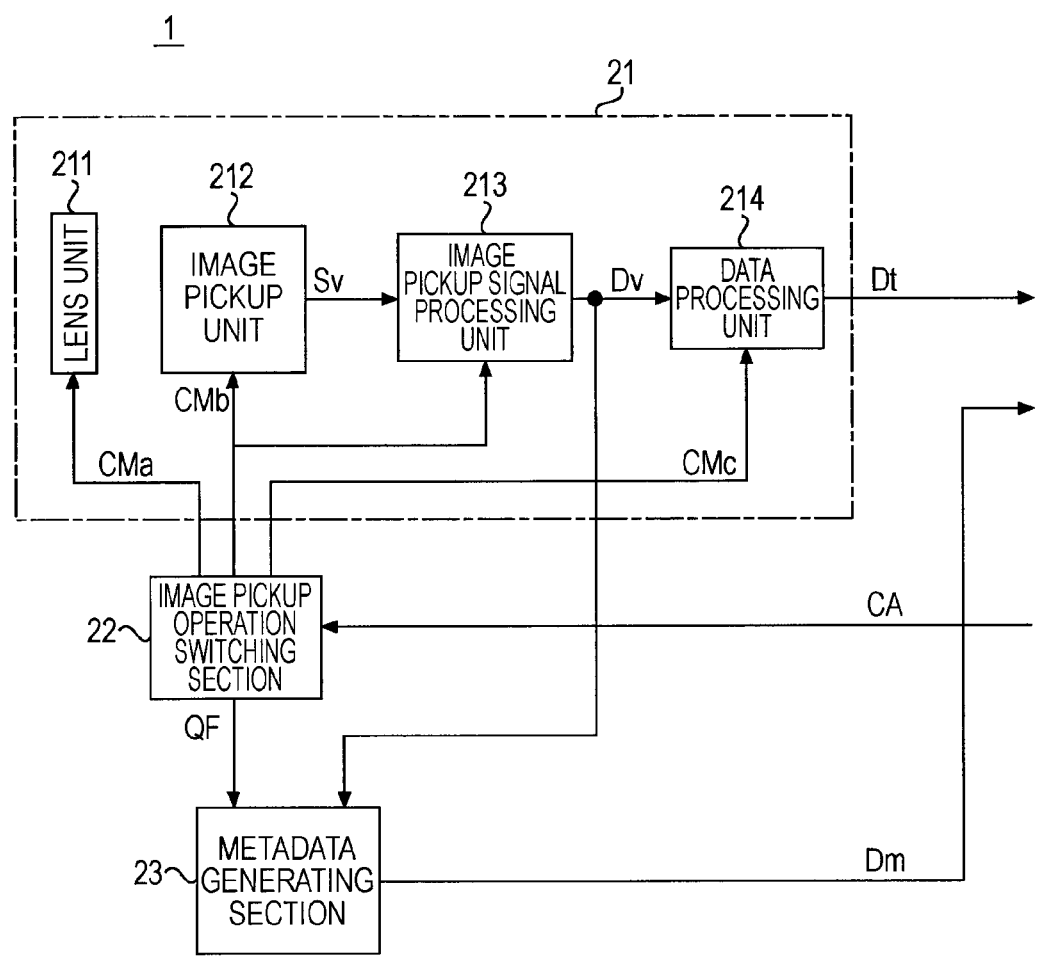
FIG. 2 is a block diagram illustrating an internal configuration of a monitoring system according to an embodiment of the present invention.

Referring now to a block diagram of FIG. 2, a detailed configuration of a monitoring camera 1 which corresponds to the monitoring camera 1a or 1b in FIG. 1A will be described. The monitoring camera 1 includes a video data generating section 21, an image pickup operation switching section 22, and metadata generating section 23. The video data generating section 21 includes a lens unit 211, an image pickup unit 212, an image pickup signal processing unit 213, and a data processing unit 214. The image pickup unit 212 generates an image pickup signal Sv by performing photoelectric conversion on image pickup light which is incident on an image pickup element (not shown) through the lens unit 211.

The image pickup unit 212 has, for example, a preamplifier and an A/D (analog/digital) converter (not shown). The preamplifier amplifies the image pickup signal Sv as an electrical signal and also removes reset noise by performing correlated double sampling. The A/D converter performs analog-to-digital conversion on the image pickup signal Sv. The image pickup unit 212 also performs processing on the image pickup signal Sv such as gain adjustment, black level stabilization, and dynamic range adjustment. The processed image pickup signal Sv is then supplied to the image pickup signal processing unit 213.

The image pickup signal processing unit 213 performs various processing on the image pickup signal Sv supplied from the image pickup unit 212 and generates video data Dv. For example, the image pickup signal processing unit 213 performs nee correction in which the image pickup signal Sv at a level equal to or higher than a predetermined signal level is compressed, γ correction in which the level of the image pickup signal Sv is corrected in accordance with a γ curve, and white clipping or black clipping in which the level of the image pickup signal Sv is controlled so as to be within a predetermined range. Then, the generated video data Dv is supplied to the data processing unit 214.

The data processing unit 214 encodes the video data Dv to generate video data Dt, so that the amount of data transmitted in communication with the client terminal 3 is reduced. The data processing unit 214 also sends the client terminal 3 the generated video data Dt in a predetermined data structure.

The image pickup operation switching section 22 performs switching of operations of the monitoring camera 1 so as to obtain an optimum image, on the basis of a switching instruction signal CA input from the client terminal 3. For example, the image pickup operation switching section 22 performs switching of an image pickup direction of the image pickup unit 212. The image pickup operation switching section 22 also supplies a control signal CMa to the lens unit 211 to switch a zoom ratio and an iris function and supplies a control signal CMb to the image pickup unit 212 and the image pickup signal processing unit 213 to switch the frame rate of a captured video image. Further, the image pickup operation switching section 22 supplies a control signal CMc to the data processing unit 214 to switch a compression ratio for video data.

The metadata generating section 23 generates metadata Dm indicating information relating to an object to be monitored. When the object to be monitored is a moving object, the metadata generating section 23 detects the moving object using the video data Dv generated by the video data generating section 21. Then, the metadata generating section 23 generates moving object detection information indicating whether a moving object has been detected and moving object position information indicating a position of the detected moving object and includes these pieces of information in metadata as object information. At this time, the detected object is assigned with a unique ID.

The information relating to an object to be monitored (also referred to as monitored object information) is not limited to information relating to a moving object and can be information indicating a state of an area to be monitored by a monitoring camera. For example, information on the temperature, brightness, etc. of the area to be monitored and information on an operation performed within the area to be monitored can also be the monitored object information. When the temperature is monitored, a result of temperature measurement is contained in the metadata. When the brightness is monitored, the metadata generating section 23 determines, for example, an average brightness of a monitored video image on the basis of the video data Dv and includes the result of the determination in the metadata.

Further, when an operation performed by a user on an ATM (automated teller machine), a POS (point of sales) terminal, or the like is monitored, information on a user operation performed on an operation key and an operation panel can be included in the metadata.

The metadata generating section 23 can also set in the metadata an image pickup operation QF (for example, a such as an image pickup direction and a zoom state at a time when an image of an object to be monitored is captured, setting information of the video data generating section 21, etc.) and time information, thereby recording a time at which the metadata was generated and a state in which the metadata was generated.

Now, configurations of video data and corresponding metadata will be described. Each of video data and metadata is composed of a data body and link information. In the video data, the data body is video data of a monitored video image captured by the monitoring camera 1. In the metadata, the data body includes information indicating an object to be monitored and attribute information defining a description scheme applied to the information on the object. The link information includes information such as association information indicating associations between the video data and the metadata and attribute information defining a description scheme applied to the content of the association information.

As the association information, for example, a time stamp and a sequence number for specifying video data can be used. The time stamp refers to time information representing a time at which the video data was generated. The sequence number refers to sequence information representing a sequence in which content data is generated. When there are a plurality of monitored video images having the same time stamp value, the sequence in which the video data having the same time stamp value can be identified. The association information may also be information for specifying a device that has generated the video data (for example, a manufacturer name, a model name, a serial number, etc.).

To describe the link information and the body of metadata, a markup language, which is defined to describe information exchanged over the World Wide Web (WWW), is used. The use of a markup language facilitates information exchange over the network 2. In addition, by using XML (Extensible Markup Language), which is used in exchange of documents and electronic data, for example, transmission of video data and metadata can be facilitated. When XML is used, attribute information defining an information description scheme uses, for example, an XML schema.

The video data and metadata generated by the monitoring cameras 1a and 1b may be provided to the client terminal 3 in one stream. It is also possible to send the client terminal 3 the video data and metadata asynchronously in different streams.

The data configurations described above in conjunction with the monitoring system 100 in FIG. 1A can be applied to a monitoring system illustrated in FIG. 1B so as to obtain the same functions and effects. A monitoring system 100 in FIG. 1B employs a server-client architecture including a server 11 and a client terminal 12. With this arrangement, it can be configured such that the server 11 having high processing performance can process a large amount of data while the client terminal 12 having low processing performance only view processing results. This functional distribution advantageously increases the flexibility of the monitoring system 100.

Figure 3:
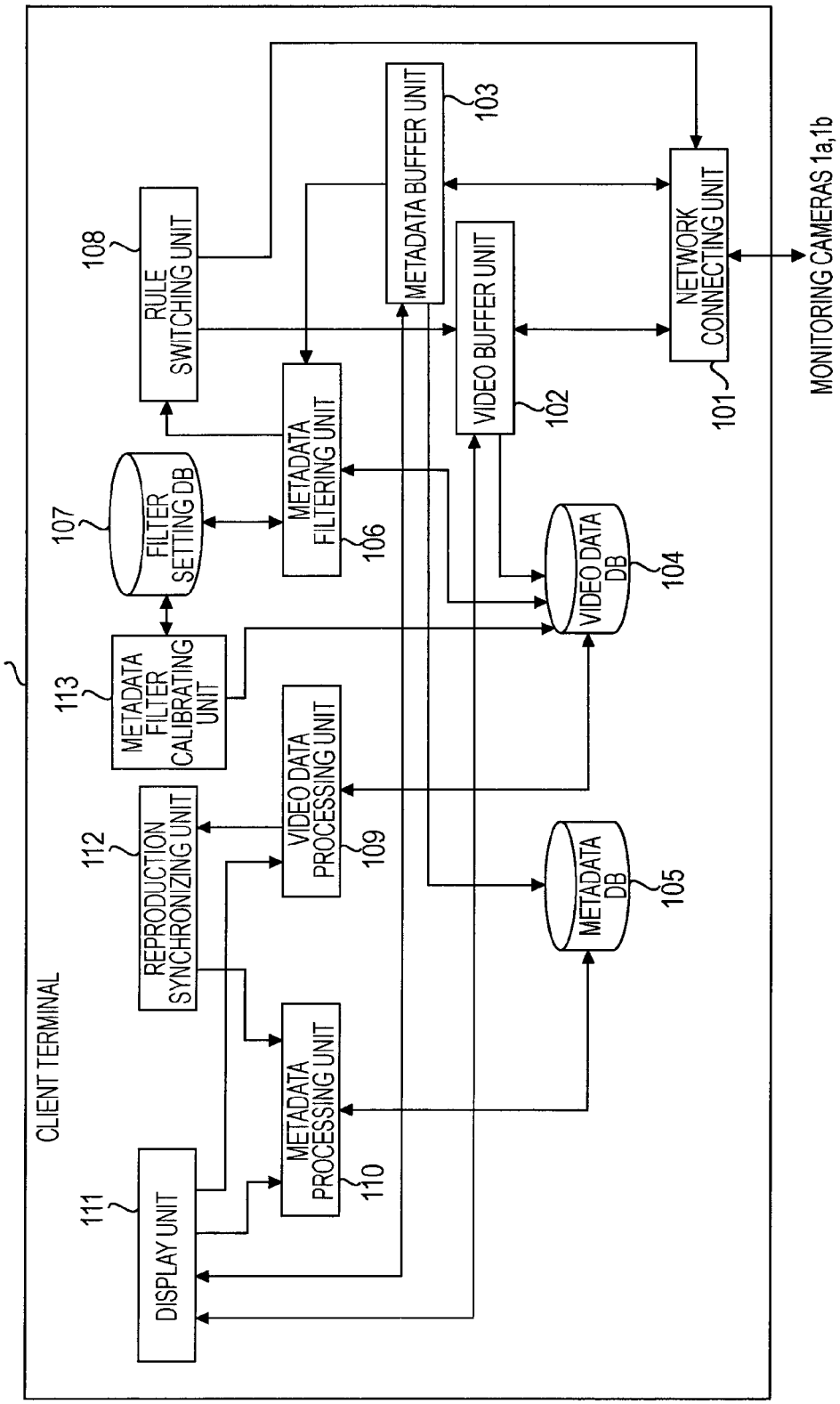
FIG. 3 is a block diagram illustrating an internal configuration of a client terminal according to an embodiment of the present invention.

Referring to a block diagram of FIG. 3, a detailed configuration of the client terminal 3 illustrated in FIG. 1A will be described. Each of functional blocks included in the client terminal 3 may be implemented by either hardware or software.

The client terminal 3 has a network connecting unit 101 for sending and receiving data to and from the monitoring cameras 1a and 1b, a video buffer unit 102 for receiving video data from monitoring cameras 1a and 1b, a metadata buffer unit 103 for receiving metadata from the monitoring cameras 1a and 1b, a filter setting database 107 for storing filter setting information based on filtering processing, a metadata filtering unit 106 for performing filtering on metadata, a metadata filter calibrating unit 113 for calibrating a metadata filter, a rule switching unit 108 for notifying the monitoring cameras 1a and 1b of a setting change, a video data database 104 for storing video data, metadata database 105 for storing metadata, a display unit 111 for displaying video data, metadata, etc., video data processing unit 109 for performing processing for reproducing video data on the display unit 111, a metadata processing unit 110 for performing processing for reproducing metadata on the display unit 111, and reproduction synchronizing unit 112 for synchronizing reproduction of metadata and reproduction of corresponding video data.

The video buffer unit 102 receives video data from the monitoring cameras 1*a* and 1*b* and decodes the video data which has been encoded. The video buffer unit 102 then stores the decoded video data in a buffer (not shown) provided in the video buffer unit 102. The video buffer unit 102 also sequentially sends the image data stored in the buffer to the display unit 111 for displaying an image. By storing the video data in the buffer, the video data can sequentially be sent to the display unit 111 regardless of a reception timing of video data from the monitoring cameras 1*a* and 1*b*. In addition, the video buffer unit 102 stores the video data stored therein in the video data database 104 on the basis of a recording request signal supplied from the rule switching unit 108 which will be described below. At this time, encoded video data may be stored in the video data database 104, and decoding of the video data may be performed in the video data processing unit 109.

The metadata buffer unit 103 stores metadata received from the monitoring cameras 1*a* and 1*b* in a buffer (not shown) provided in the metadata buffer unit 103. The metadata buffer unit 103 sequentially sends the metadata stored therein to the display unit 111. The metadata buffer unit 103 also sends the metadata stored in the buffer to the metadata filtering unit 106 which will be described below. By storing the metadata in the buffer, the metadata can sequentially be sent to the display unit 111 regardless of a reception timing of the metadata from the monitoring cameras 1*a* and 1*b*. The metadata buffer unit 103 can also supply the metadata to the display unit 111 in synchronization with video data. Further, the metadata buffer unit 103 stores the metadata received from the monitoring cameras 1*a* and 1*b* in the metadata database 105. When storing the metadata in the metadata database 105, the metadata buffer unit 103 appends time information of the video data to be synchronized with the metadata to the metadata. By using the appended time information, metadata corresponding to a desired time can be read from the metadata database 105 without reading out the content of the metadata to determine the corresponding time.

The filter setting database 107 stores filter setting information according to filtering processing performed by the metadata filtering unit 106 described below and also supplies the filter setting information to the metadata filtering unit 106. In filter setting, a criterion for determining whether or not output of alarm information or the like or switching of image pickup operations of the monitoring cameras 1*a* and 1*b* is necessary is indicated for each piece of monitored object information contained in metadata. By filtering metadata using this filter setting information, a result of filtering can be indicated for each piece of monitored object information. This filtering result may indicate that it is necessary to output alarm information or the like or indicate that it is necessary to switch pickup operations of the monitoring cameras 1*a* and 1*b*.

The metadata filtering unit 106 filters the metadata using the filter setting information stored in the filter setting database 107 and determines whether or not to generate an alarm. Then, the metadata filtering unit 106 filters the metadata received from the metadata buffer unit 103 or the metadata provided by the metadata database 105 and sends the result of the filtering to the rule switching unit 108.

The metadata filter calibrating unit 113 performs processing for increasing accuracy of alarm information received through the metadata filtering unit 106, such as "number of objects" and "number of cumulative objects". This processing of the metadata filter calibrating unit 113 will be described in more detail below.

The rule switching unit 108 generates a setting change signal on the basis of a filtering result provided by the metadata filtering unit 106 and notifies the monitoring cameras 1*a* and 1*b* of the setting change. For example, on the basis of the filtering result provided by the metadata filtering unit 106, the rule switching unit 108 outputs an instruction for switching operations of the monitoring cameras 1*a* and 1*b* such that a video image suitable for monitoring can be acquired. In addition, the rule switching unit 108 can supply a recording request signal to the video buffer unit 102 on the basis of the filtering result so that the video data database 104 stores video data received by the video buffer unit 102.

The video data database 104 stores video data acquired in the video buffer unit 102. The metadata database 105 stores metadata acquired in the metadata buffer unit 103.

The video data processing unit 109 performs processing for displaying the video data stored in the video data database 104 on the display unit 111. Specifically, the video data processing unit 109 reads the video data sequentially from a reproduction start position designated by a user and supplies the read video data to the display unit 111. The video data processing unit 109 also supplies a reproduction position (reproduction time) of the video data being reproduced to the reproduction synchronizing unit 112.

The reproduction synchronizing unit 112 controls operations of the metadata processing unit 110. At this time, the reproduction synchronizing unit 112 supplies a synchronization control signal to the metadata processing unit 110 such that a reproduction position of video signal provided by the video data processing unit 109 is synchronized with a reproduction position at which corresponding metadata stored in the metadata database 105 is reproduced in the metadata processing unit 110.

The metadata processing unit 110 performs processing for displaying the metadata stored in the metadata database 105 on the display unit 111. Specifically, the metadata processing unit 110 reads the metadata sequentially from a reproduction start position designated by the user and supplies the read metadata to the display unit 111. When reproducing both the video data and the metadata, the metadata processing unit 110 controls reproduction operations on the basis of the synchronization control signal supplied from the reproduction synchronizing unit 112, as described above, and outputs the metadata that is synchronized with the video data to the display unit 111.

The display unit 111 displays live video data supplied from the video buffer unit 102, reproduction video data supplied from the video data processing unit 109, live metadata supplied from the metadata buffer unit 103, and reproduction metadata supplied from the metadata processing unit 110. The display unit 111 displays (outputs) a video image indicating a monitoring result based on a filtering result using either a monitored image, an image representing metadata, or an image representing a filter setting, or a composite image of these images, on the basis of filter setting information provided by the metadata filtering unit 106.

The display unit 111 also functions as a GUI (graphical user interface). Thus, a user is allowed to define a filter by selecting a filter setting menu item or the like displayed on the display unit 111 using operation keys, a mouse, a remote controller, or the like. The GUI also allows display of information on each processing unit, a result of analysis of alarm information, or the like.

Figure 4:
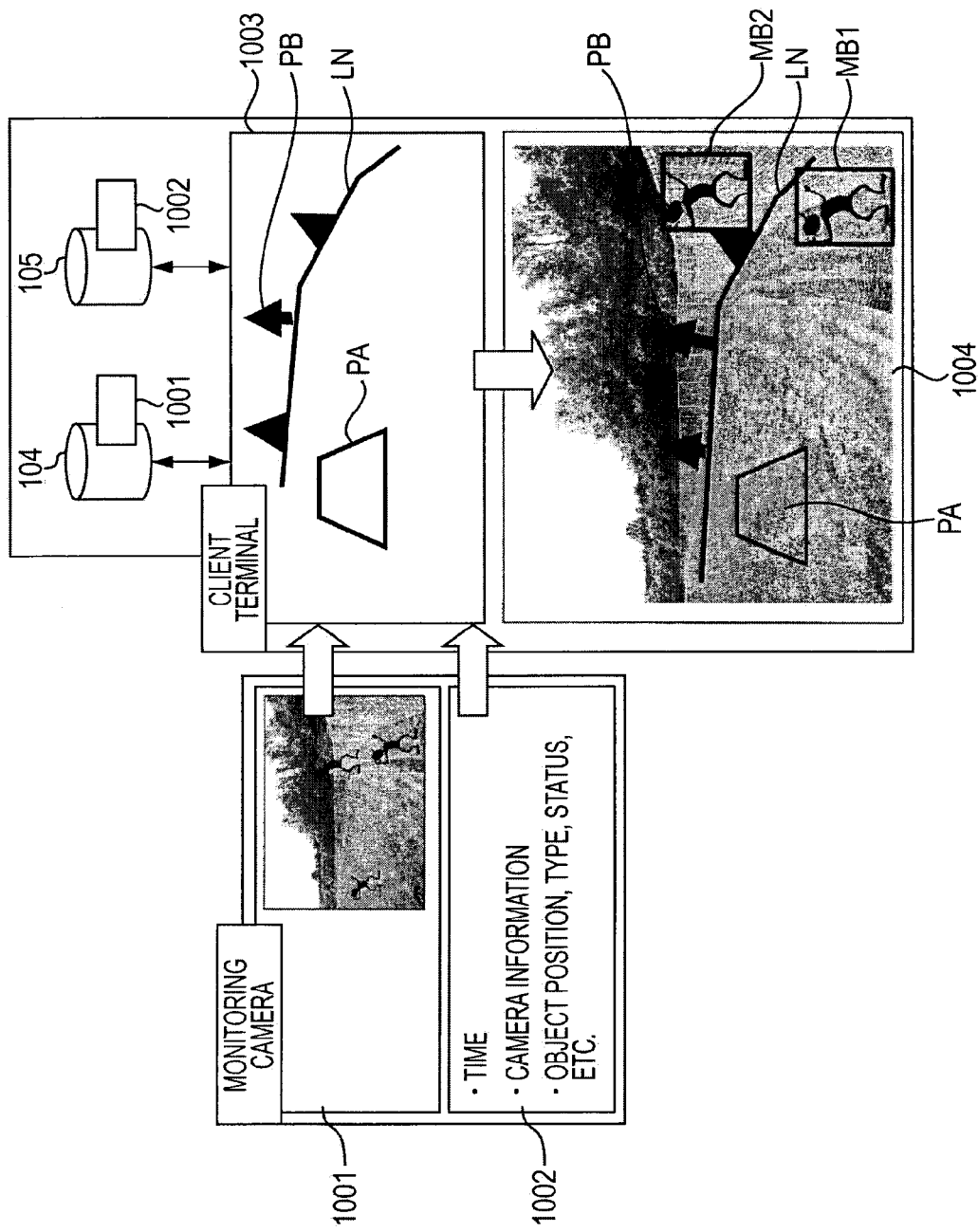
FIG. 4 illustrates an example of display of video data and metadata according to an embodiment of the present invention.

FIG. 4 illustrates an example of display of video data and metadata on the display unit 111 of the client terminal 3 according to an embodiment of the present invention. As illustrated in the figure, video data 1001 generated by the monitoring cameras 1a and 1b and corresponding metadata 1002 are supplied to the client terminal 3 via the network 2. Types of metadata generated by each of the monitoring cameras 1a and 1b include time information, moving object information based on a video analysis result (for example, position, type, and status), and a current state of the monitoring camera. This display of video data and metadata may also be obtained when a client terminal or a server has a software module and a monitoring camera operates independently of a network.

The client terminal 3 acquires, analyzes, and stores the video data 1001 and the metadata 1002 supplied from the monitoring cameras 1a and 1b. The video data 1001 and the metadata 1002 input to the client terminal 3 are stored in the video data database 104 and the metadata database 105, respectively. Setting of various filters is performed through a filter setting screen (a filter setting menu) displayed on the display unit 111 using filter settings function provided in the client terminal 3. The results the settings are stored in the filter setting database 107 as setting information.

As shown in FIG. 4, in a filter setting display screen 1003, a line LN generated on the basis of the filter setting and an area PA are displayed. An arrow PB indicates a direction of passage of an object across the LN, which is to be detected.

In a monitored video image 1004 in FIG. 4, an image in which the video data 1001 and an image representing a filter are superimposed by the display unit 111 is displayed. The line LN is set as an image representing the "Passing" filter described above. When a setting is made such that the number of objects that pass through the filter is counted, the number of objects that have passed across the line LN is calculated. In this screen, an object MB1 and an object MB2 are detected as having passed across the line LN, and thus the calculated number of objects is 2.

However, when objects such as the objects MB1 and MB2 are recognized by the monitoring cameras 1a and 1b, each of the objects is recognized as a polygon (a quadrangle in this example) as illustrated in FIG. 4. Thus, when a plurality of objects are adjacent to each other, the monitoring cameras 1a and 1b may recognize these objects as one object.

Figure 5:
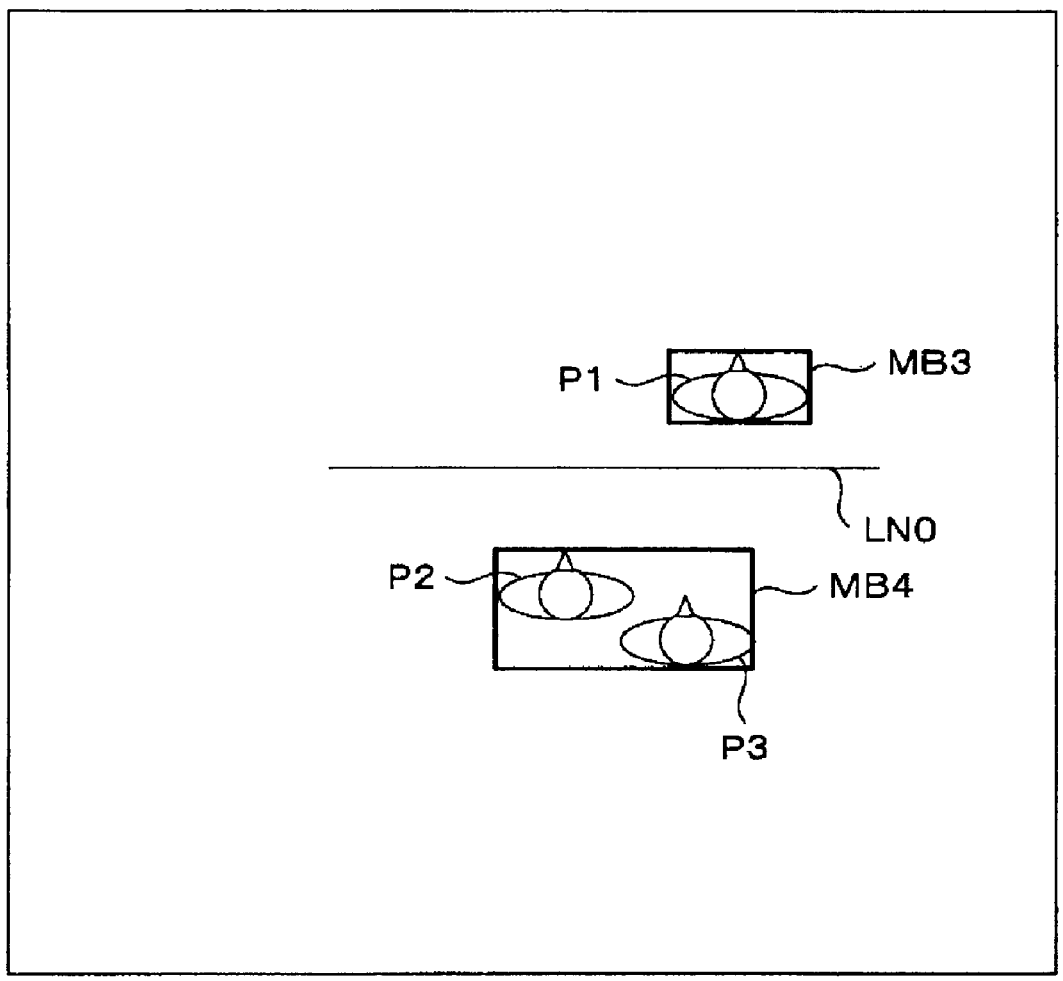
FIG. 5 illustrates an example of a monitored image according to an embodiment of the present invention.

FIG. 5 illustrates one frame of a video image of an area captured by a monitoring camera which is set at a position in a ceiling so as to capture an image downward. In this case, a line LN0 is set as a filter ("Passing") and the number of objects that passes across the line LN0 is counted. In the frame image of FIG. 5, a case is illustrated in which three walking persons P1 to P3 are recognized as two objects MB3 and MB4 by the monitoring camera. This is because the working persons P2 and P3 are positioned adjacent to each other and thus recognized as one object MB4. If the working persons P2 and P3 pass across the line LN0 while being recognized as the object MB4, the number of objects to be counted at the line LN0 is 1.

According to an embodiment of the present invention, filter calibration is performed before actual filtering is performed by the metadata filtering unit 106 with a view to reducing errors in results of filtering. In this filter calibration, at least one virtual filter is automatically arranged for a filter extracted from the filter setting database 107 or a newly set filter, at a position which is expected to allow filtering results with increased accuracy to be obtained. Filtering is then performed using the virtual filter. If filtering results with an increased accuracy can be obtained as a result of the filtering, the virtual filter is employed as a primary filter.

Figure 6:
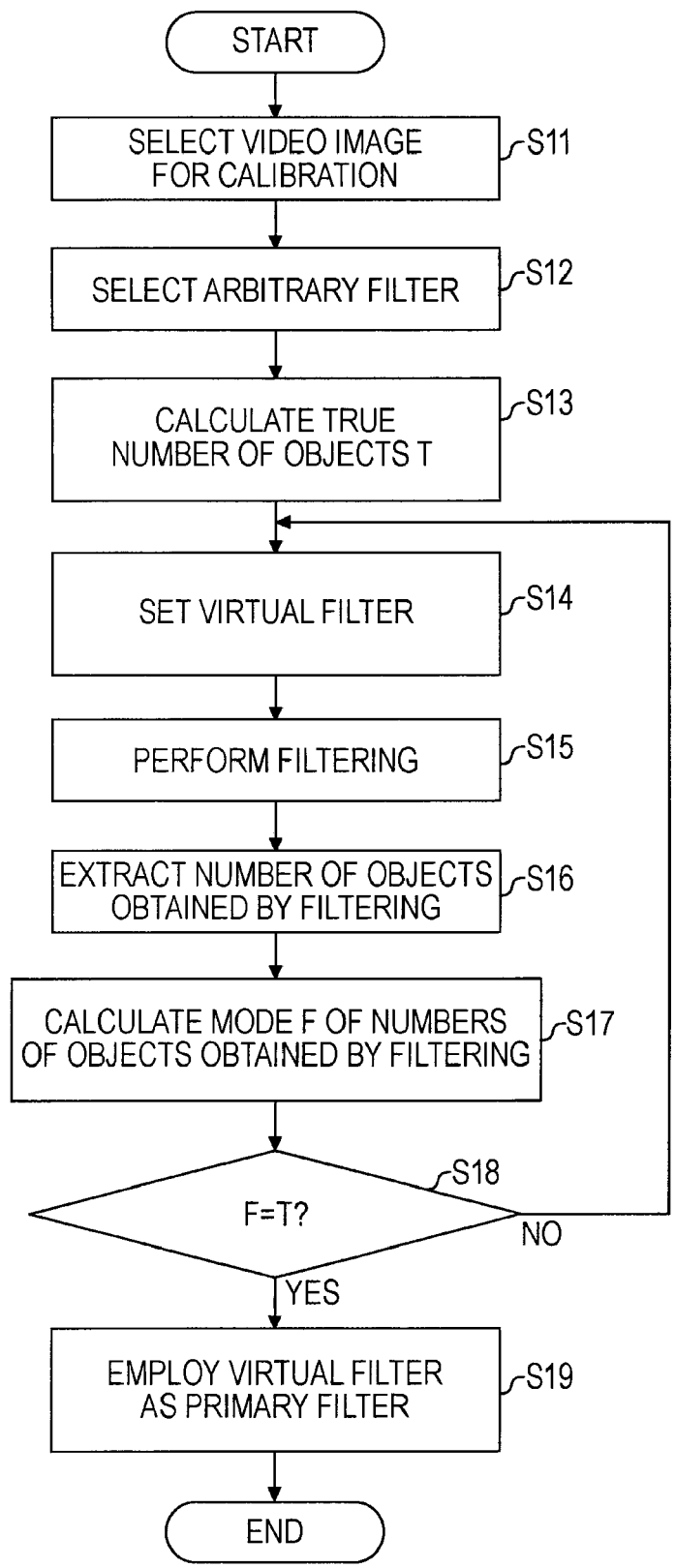
FIG. 6 is a flowchart illustrating an example a procedure of filter calibration processing according to an embodiment of the present invention.

Referring to a flowchart of FIG. 6, a processing procedure of filter calibration performed by the metadata filter calibrating unit 113 will be described. In this example, a case is illustrated where calibration is performed on a "Passing" filter which counts the number of objects that pass across a predetermined line. At STEP S11, a video image used for filter calibration (also referred to as calibration video image) is selected from the video data database 104 or the video buffer unit 102. It is assumed that the video image to be selected is video data having a predetermined length of time.

At STEP S12, a filter on which calibration is desired to be performed is selected from the filter setting database 107 or is newly set. The selected filter is displayed in a screen as a fixed line such as the line LN0 in FIG. 5. In the case of the newly set filter, such a line is set in the screen.

At STEP S13, the number of objects obtained when the selected filter or the newly set filter is applied to the calibration video data for filter calibration. Specifically, an true number is calculated. The true number T is the number of objects in a video image for filter calibration which have passed through the filter (line in this case) selected in STEP S12 during a time period from a start time of the calibration video data to an end time of the calibration video data. The true number T refers to a number of times that objects have passed across the line set as the filter and is obtained by counting each of the objects in the image as one object even when some of the objects are adjacent to each other as described with reference to FIG. 5. To obtain the true number T, a dedicated system capable of calculating an accurate number of objects that have passed across a line or an approximate value of the true number T can be used. It may also be possible for a person to count the true number T by visual observation.

Figure 7:
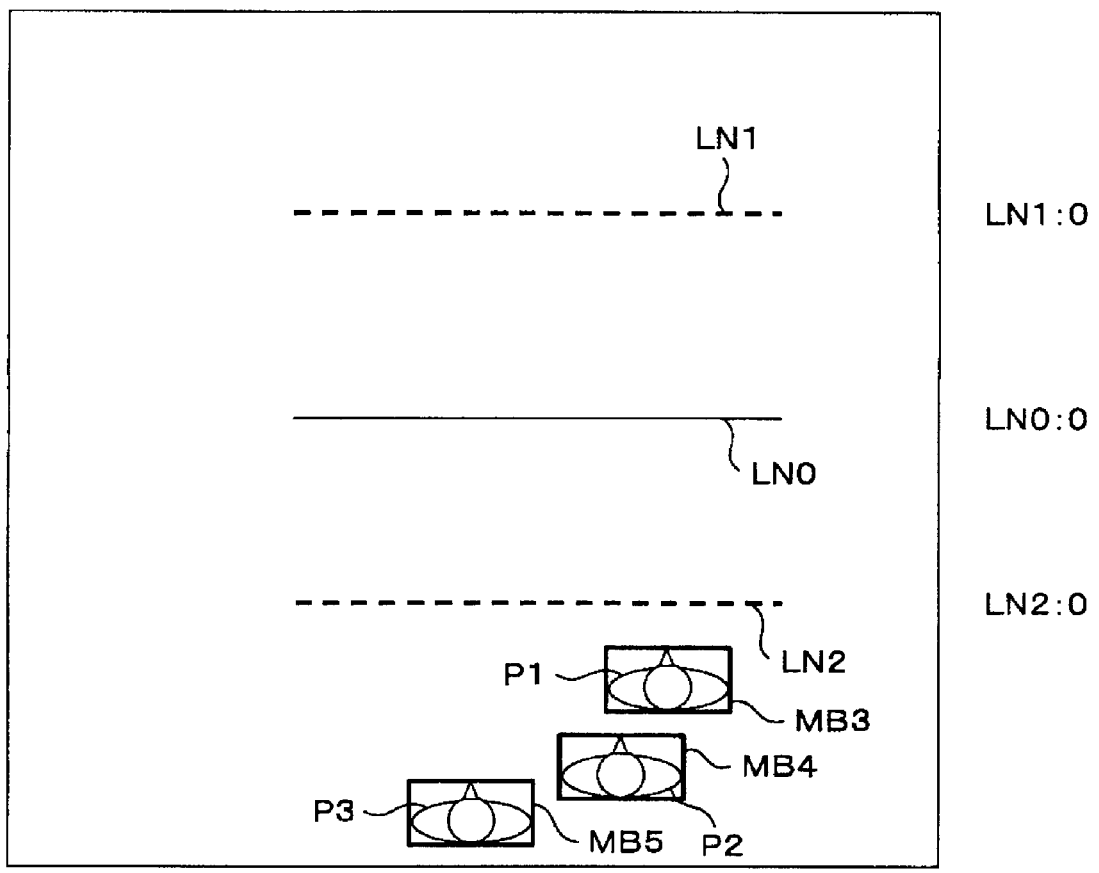
FIG. 7 illustrates an example of a monitored image according to an embodiment of the present invention.

When the true number T is obtained, the metadata filter calibrating unit 113 selects positions of the virtual filters and arranges the virtual filters at the selected positions at STEP S14. Specifically, a plurality of virtual filters are complementarily set around the filter that has been selected or the newly set in STEP S12. The positions of these virtual filters are selected such that a mode of the numbers of objects, which is obtained by determining the most frequent value among values given as the results of filtering using the individual virtual filters, is close to the true number T. An example of a filter setting that brings about such a mode is illustrated in FIG. 7. A line LN0 represents the filter which has been selected or newly set in the processing of STEP S12, and a line LN1 and a line LN2 represent filters that are newly set as the virtual filters.

Subsequently, at STEP S15, the metadata filtering unit 106 performs filtering, and the metadata filter calibrating unit 113 extracts the number of objects obtained through filtering of each of the filters corresponding to the lines LN0 to LN2 at STEP S16. Then, the metadata filter calibrating unit 113 calculates the mode F of the numbers of objects obtained through the filters corresponding to the lines LN0 to LN2 at STEP S17. At this time, the true number T and the mode F of the numbers of object obtained through the individual filters are compared at STEP S18. If T is not equal to F, the procedure returns to STEP S14 and the processing sequence is repeated until T becomes equal to F. If T is equal to F, the virtual filters are employed as primary filters and then stored in the filter setting database 107 at STEP S19. In this case, an algorithm in which the virtual filters are employed as primary filters when F is not equal to T but is an approximate value of T (T≈F).

FIG. 7 illustrates an example of a case in which the virtual filters are arranged at appropriate positions. The line LN0 is the filter that has been selected or newly set in the processing of STEP S12 and the lines LN1 and LN2 have been added as the virtual filters, which corresponds to the processing of STEP S14. Video data of a video image of persons P1 to P3 walking upward from lower portions of the screen is used as the video image for filter calibration (filter calibration video image). This video image is captured by a monitoring camera mounted to point vertically downward from the ceiling. Each of FIGS. 7 to 15 illustrates a frame image of the filter calibration video image, and the images of FIGS. 7 to 15 are in time series in that order. In a right portion of each of the figures, a cumulative total of objects obtained through each filter at the corresponding time point is indicated.

FIG. 7 illustrates a state in which the monitoring camera recognizes the person P1 as an object MB3, the person P2 as an object MB4, and the person P3 as an object MB5. At this time, none of the objects has been passed across any of the lines LN0 to LN2. Thus, the number of objects obtained through each filter (i.e., the number of objects that have passed across each line) is indicated as 0.

Figure 8:
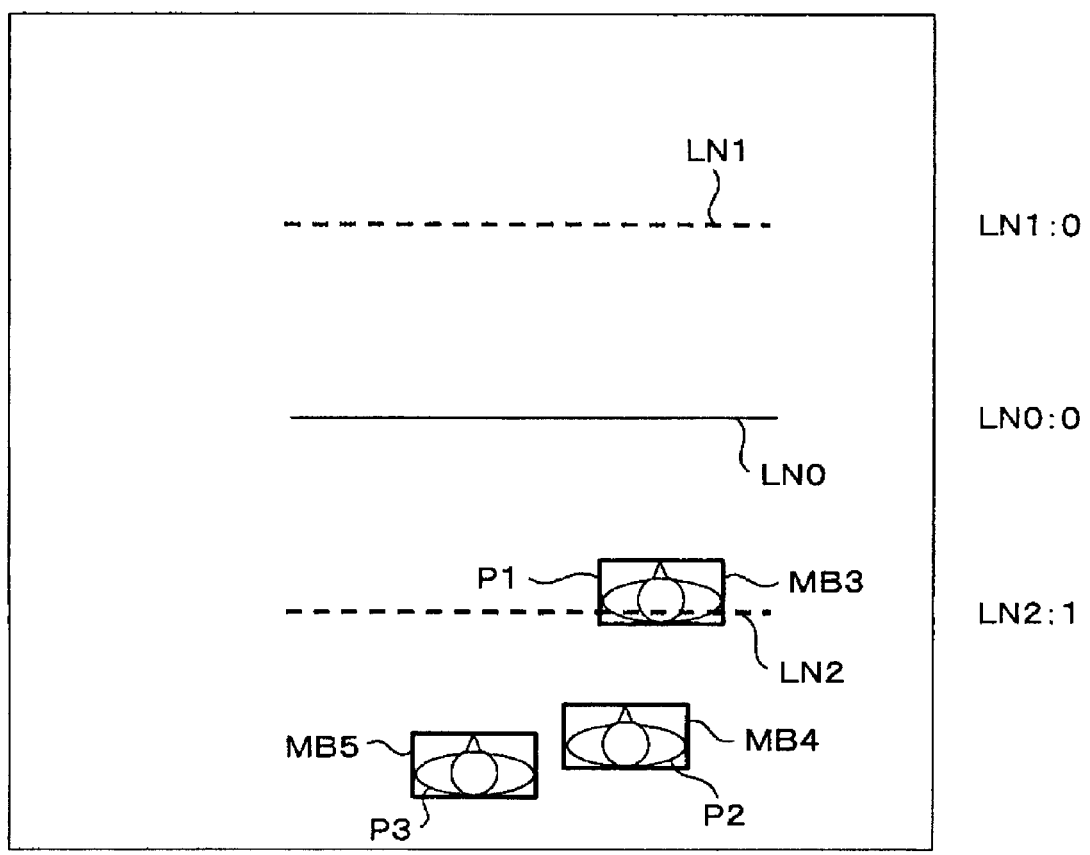
FIG. 8 illustrates an example of a monitored image according to an embodiment of the present invention.

FIG. 8 is a frame image subsequent to the frame image of FIG. 7 and illustrates a state in which the P1 recognized as the object MB3 is passing across the line L2 which is set as a virtual filter. Thus, the cumulative total of objects at the line LN2 is indicated as 1.

Figure 9:
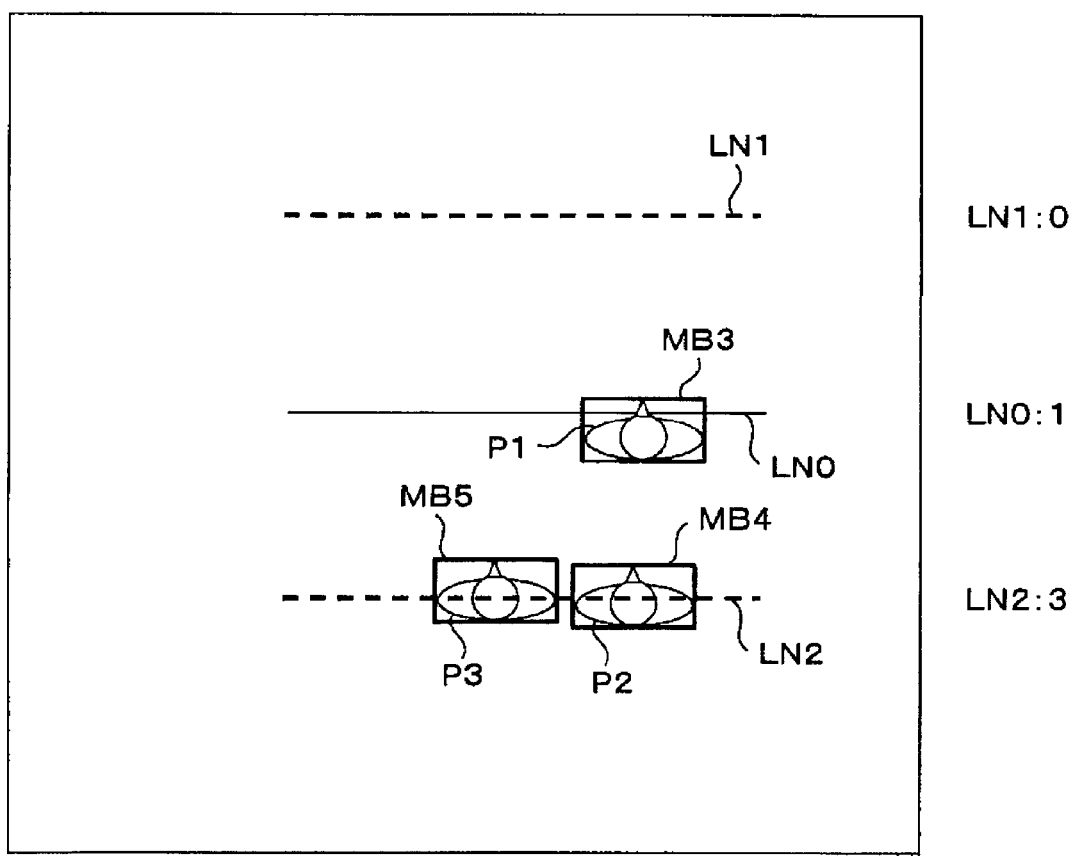
FIG. 9 illustrates an example of a monitored image according to an embodiment of the present invention.

FIG. 9 illustrates a state in which the person P1 recognized as the object MB3 is passing across the line LN0, and the person P2 recognized as the object MB4 and the person P3 recognized as the object MB5 are passing across the line LN2. Thus, the cumulative number of objects at the line LN0 is 1, and the cumulative number of objects at the line LN2 is 3 since the objects MB3, MB4, and MB 5 have passed across the line LN2 by this time point of the frame image.

Figure 10:
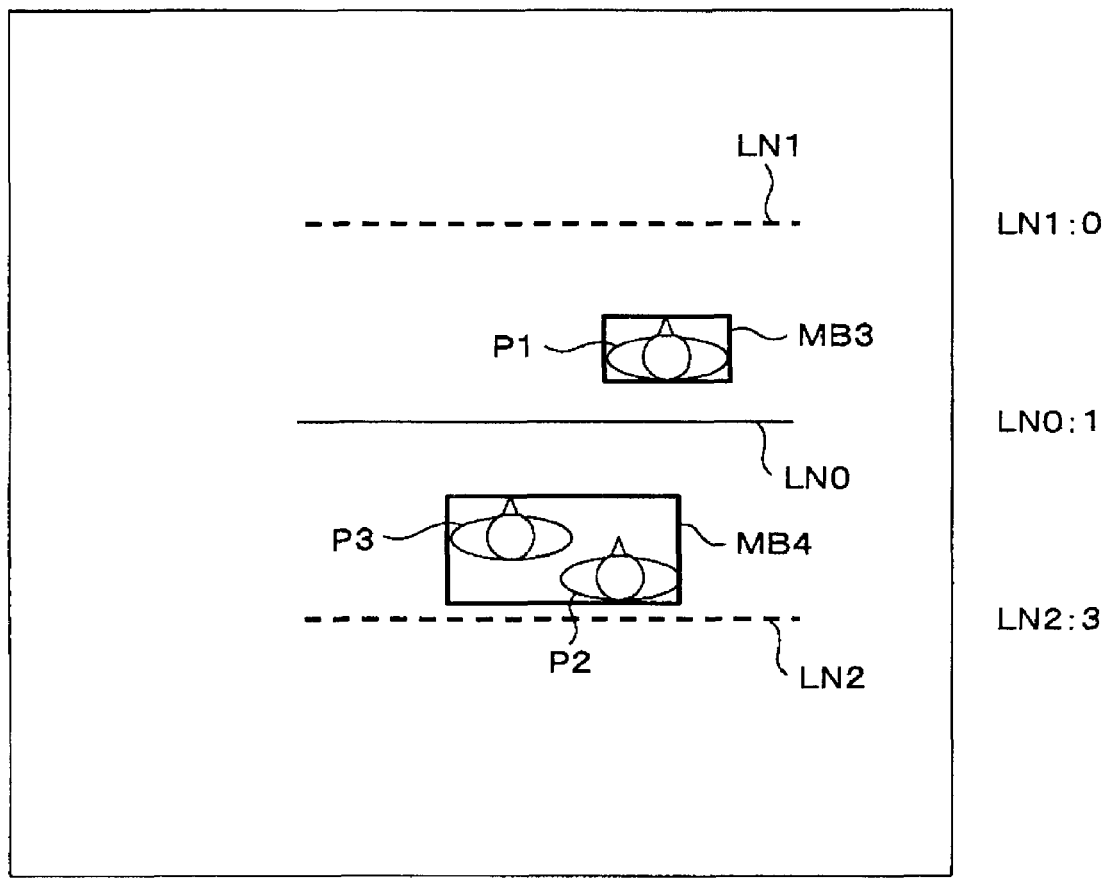
FIG. 10 illustrates an example of a monitored image according to an embodiment of the present invention.

Thus, when one person is appropriately recognized as one object, an error does not occur between the number of objects obtained through a filter and the number of persons who have actually passed across a line representing the filter. However, when moving a plurality of objects to be monitored are adjacent to each other, the different moving objects are recognized as one object by a monitoring camera. In addition, when the monitoring camera detects movement of a body part of one person to be monitored, the person and the body part are recognized as different objects. FIG. 10 illustrates a case where the person P2 and the person P3 are recognized as one object MB4.

Figure 11:
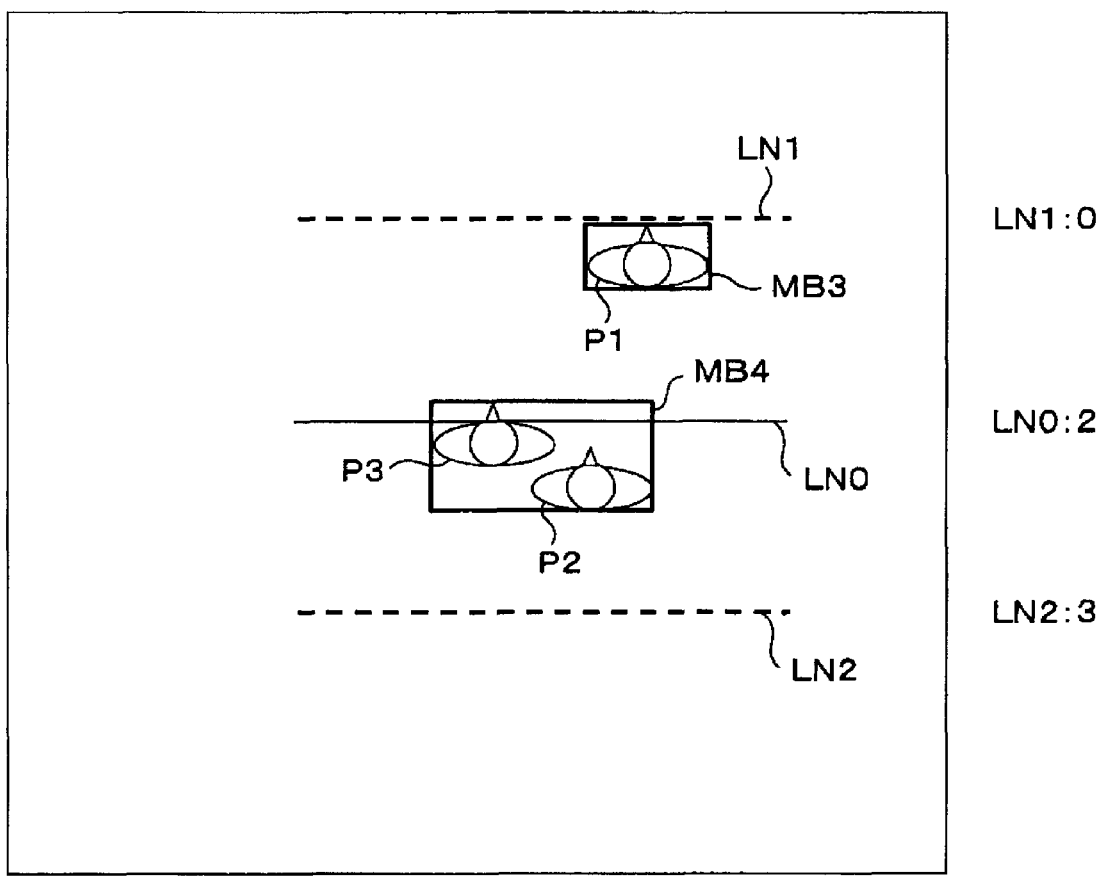
FIG. 11 illustrates an example of a monitored image according to an embodiment of the present invention.

FIG. 11 illustrates a state where the persons P2 and P3 recognized as one object MB4 at the time point of the frame image of FIG. 10 are passing across the line LN0 while being recognized as the object MB4. Thus, the cumulative number of objects at the line LN0 is the total value of the objects MB3 and MB4, i.e., 2. The cumulative numbers at the lines LN0 and the line LN2 should be the same. However, different numbers of objects recognized at the line LN0 and the line LN2 are obtained due to the difference between the positions of the line LN0 and the line LN2.

Figure 12:
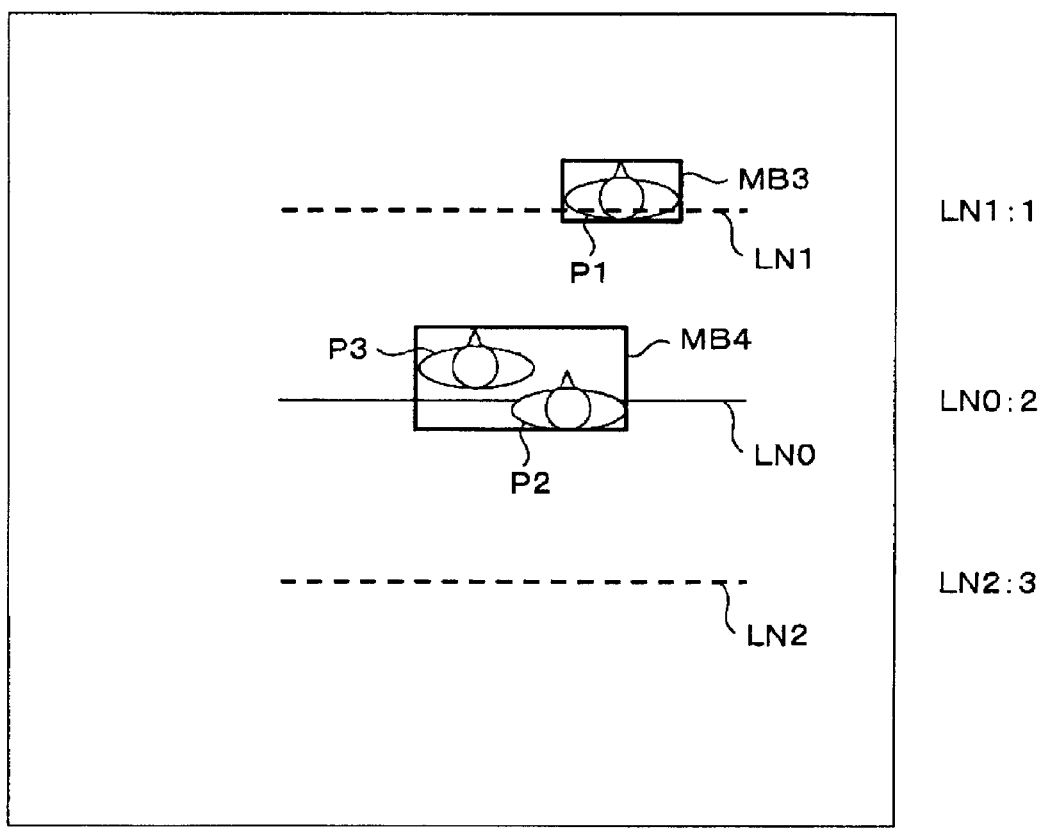
FIG. 12 illustrates an example of a monitored image according to an embodiment of the present invention.
Figure 13:
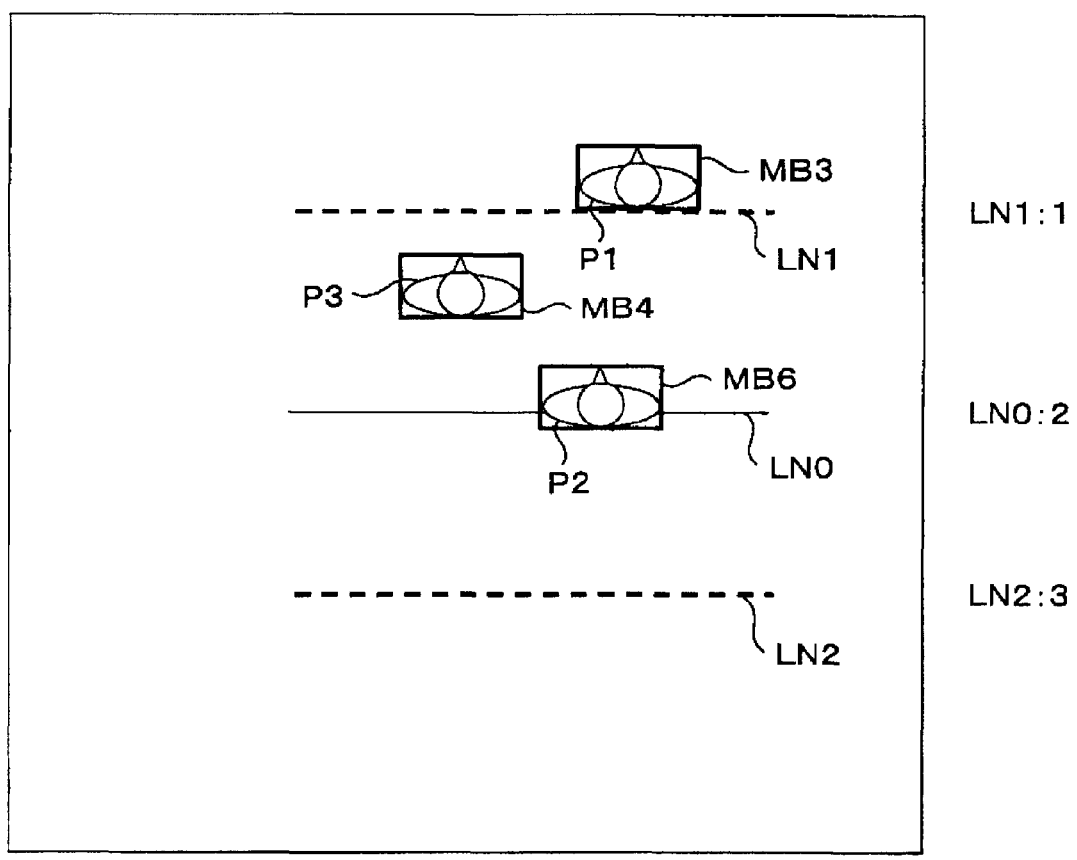
FIG. 13 illustrates an example of a monitored image according to an embodiment of the present invention.
Figure 14:
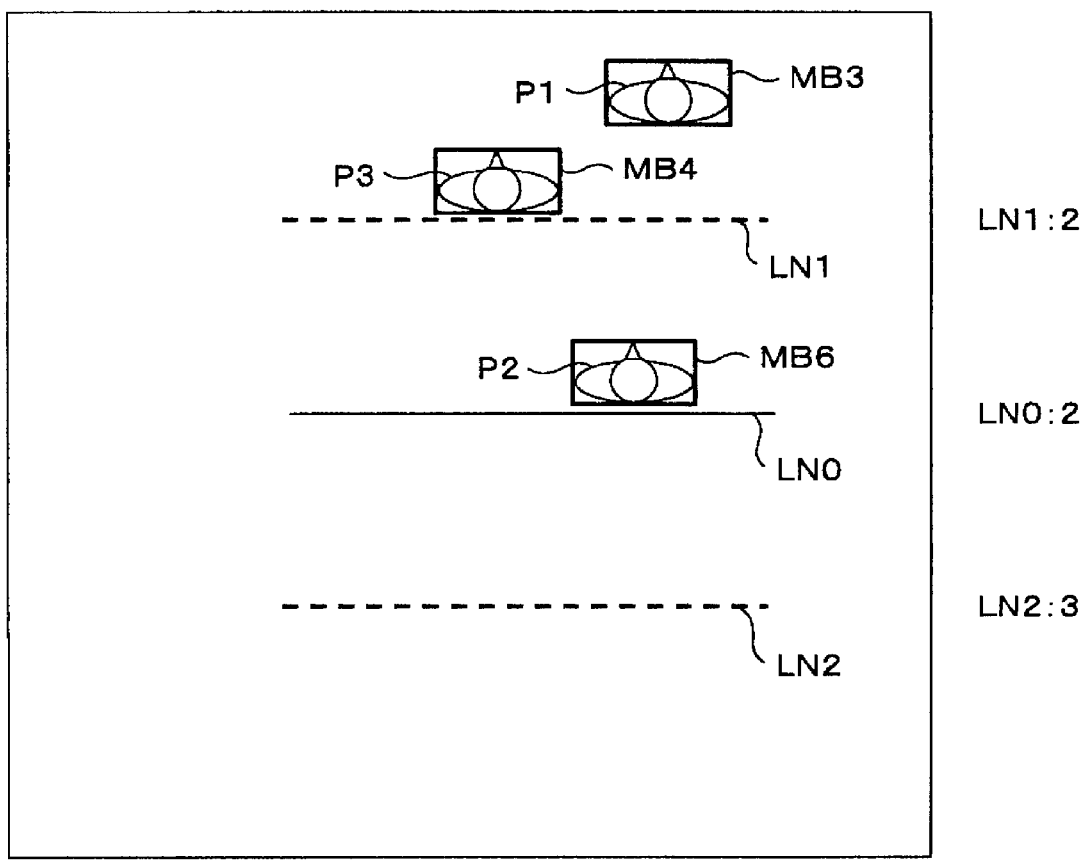
FIG. 14 illustrates an example of a monitored image according to an embodiment of the present invention.

FIG. 12 illustrates a state in which the person P1 recognized as the object MB3 is passing across the line LN1, and thus the cumulative number of objects at the line LN1 is 1. FIG. 13 illustrates a state in which the person P2 and the person P3 are recognized as different object again as an object MB6 and the object MB4, respectively. In the subsequent frame illustrated in FIG. 14, the person P3 recognized as the object MB4 has passed across the line LN1. Since the person P1 recognized as the object MB3 has already passed across the line LN1, the cumulative number of objects at the line LN1 is 2.

Figure 15:
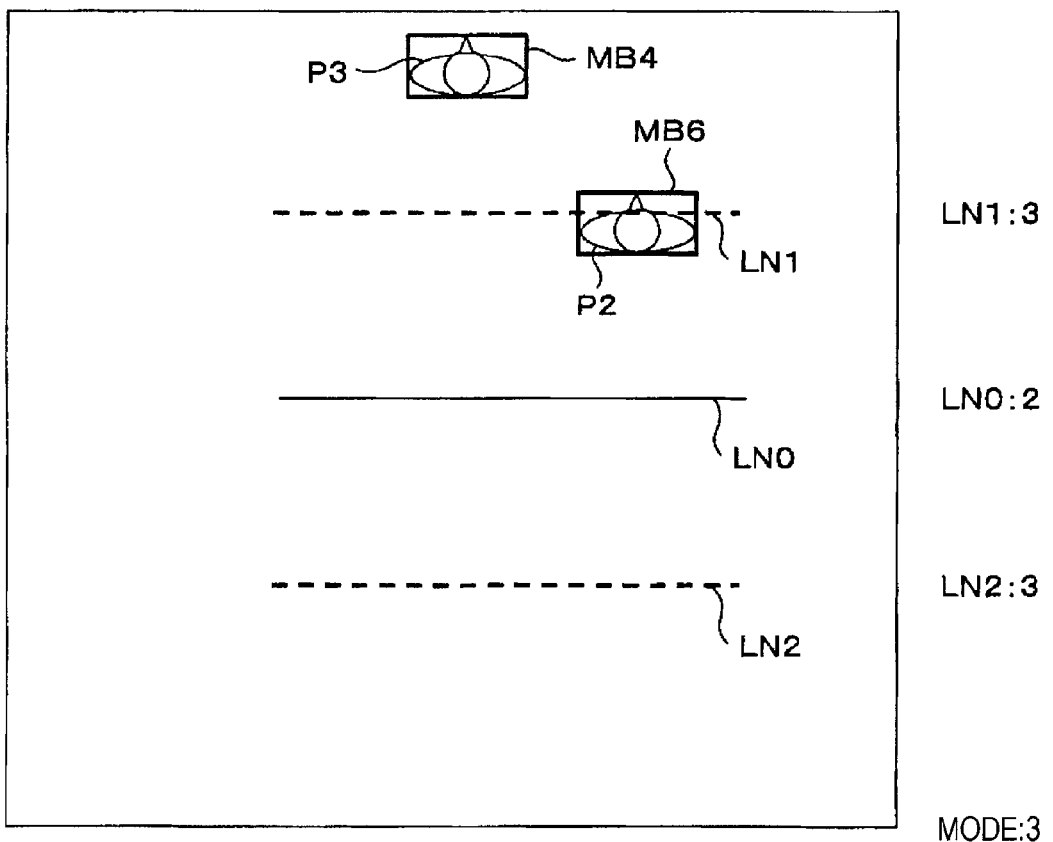
FIG. 15 illustrates an example of a monitored image according to an embodiment of the present invention.

FIG. 15 illustrates a state in which the person P2 recognized as the object MB6 is passing across the line LN1, and thus the cumulative number of objects at the line LN1 at this time point is 3 (MB3, MB4, and MB6). The processing described using FIG. 7 to FIG. 15 corresponds to the execution of filtering in STEP S15 and the extraction of the number of objects through each filtering in STEP S16, which are described with reference to FIG. 6. Consequently, the mode of the numbers of objects is obtained through filtering, which corresponds to the processing of STEP S17 in FIG. 6. In the example of FIG. 15, the cumulative numbers of objects at the line LN2, the line LN0, and the line LN1 are 3, 2, and 3, respectively, and thus the mode of the numbers of objects is 3.

In the example of FIGS. 7 to 15, the number of objects (persons) which have actually passed across the line LN0 is 3. Thus, the true number T to be prepared is 3. Then, by comparing T and F, which corresponds to the processing of STEP S18 in FIG. 6, the appropriateness of the positions of the virtual filters can be measured. In this case, since T==F=3, the positions of the virtual filters and the selected filter or the newly set filter for the filter calibration are determined to be appropriate. Thus, the lines LN0 to LN2 are employed as the primary filters and stored in the filter setting database 107, which corresponds to the processing of STEP S19 in FIG. 6. When a large error between T and F occurs, the positions of the lines corresponding to the virtual filters are changed and reset, and the processing of STEP S15 to STEP S18 is repeated until T=F or T≈F is satisfied.

By performing actual filtering using the primary filter obtained through the above processing, the cumulative number of objects as the results of the actual filtering is equal to or approximate to a value based on actual states of objects to be monitored.

In addition, although three filters are used in the example of FIG. 7 to FIG. 15, the number of filters used is not limited to three. When the numbers of objects obtained through the individual filters are set as $C(1)$-$C(n)$ (n is an integer), the mode F can be obtained by substituting the number of objects into a function f for calculating a mode as $F=f(C(1) \ldots C(n))$.

Further, when the virtual filters are set, adjustment of the reproduction rate or magnification of the calibration video data may be performed for the optimum filter setting.

The above-described series of processing may be performed by software as well as hardware. When the series of processing is to be performed by software, programs constituting the software are installed into a computer incorporated into dedicated hardware. The series of processing may also be performed by installing programs constituting desired software into, for example, a general-purpose computer capable of executing various functions using various programs installed thereinto.

In the embodiment described above, the case is described in which filtering is performed on metadata output from a monitoring camera. However, the embodiment is not limited to the case, and may also be applied to a case where other types of data are filtered. For example, it is possible to filter video data and perform subsequent processing such as analysis on the video data.

It should be understood by those skilled in the art that various modifications, combinations, sub-combinations and alterations may occur depending on design requirements and other factors insofar as they are within the scope of the appended claims or the equivalents thereof.

What is claimed is:

1. A monitoring system comprising:
a monitoring image pickup apparatus configured to capture and output video data;
a filter setting unit configured to store filter setting information for analyzing the video data;
a filtering unit configured to determine whether the video data satisfies a filter condition of a filter stored in the filter setting unit and, when the video data satisfies the filter condition, perform filtering in which the number of objects detected from the video data is counted and the result of the counting is output; and
a filter calibrating unit configured to perform filter calibration in which at least one virtual filter is arranged with respect to a predetermined filter read from the filter setting unit or a newly set filter, filtering is performed by the filtering unit using the predetermined filter read from the filter setting unit or the newly set filter and the virtual filter, a mode of values obtained as results of the filtering is calculated, and when the mode is determined to be equal to or approximate to a true value to be obtained as the result of the filtering, the true value having been obtained beforehand, the virtual filter is stored in the filter setting unit as a primary filter.

2. The monitoring system of claim 1,
wherein the predetermined filter is set for metadata indicating information relating to an object to be monitored, the metadata being output together with the video data by the monitoring image pickup apparatus.

3. The monitoring system of claim 1,
wherein the virtual filter is arranged at a position to allow filtering using the predetermined filter read from the filter setting unit or the newly set filter to more closely approximate the true value.

4. The monitoring system of claim 3,
wherein the setting of the virtual filter by the filter calibrating unit is repeated by changing a setting position of the virtual filter, until the mode is determined to be equal to or approximate to the true value.

5. A filter calibration method for calibrating a filter used for filtering in which video data is acquired from a monitoring image pickup apparatus and the number of objects detected from the video data is counted and output, the method comprising the steps of:
storing filter setting information;
setting at least one virtual filter with respect to a predetermined filter read from among filters corresponding to the stored filter setting information or a newly set filter; and
performing filtering using the predetermined filter or the newly set filter and the virtual filter, calculating a mode of values obtained as results of the filtering, and storing the virtual filter as a primary filter when the mode is determined to be equal to or approximate to a true value to be obtained as the result of the filtering, the true value having been obtained beforehand.

6. A non-transitory computer readable medium, having stored thereon a filter calibration program for calibrating a filter used for filtering in which video data is acquired from a monitoring image pickup apparatus and the number of objects detected from the video data is counted and output, the program comprising the steps of:
storing filter setting information;
setting at least one virtual filter with respect to a predetermined filter read from among filters corresponding to the stored filter setting information or a newly set filter; and
performing filtering using the predetermined filter or the newly set filter and the virtual filter, calculating a mode of values obtained as results of the filtering, and storing the virtual filter as a primary filter when the mode is determined to be equal to or approximate to a true value to be obtained as the result of the filtering, the true value having been obtained beforehand.

7. The monitoring system of claim 1,
wherein the at least one virtual filter is complementarily set around the predetermined filter or the newly set filter.

8. The monitoring system of claim 1,
wherein the mode is determined to be equal to the true value.

9. The filter calibration method of claim 5,
wherein the filtering is set for metadata indicating information relating to an object to be monitored, the metadata being output together with the video data by the monitoring image pickup apparatus.

10. The filter calibration method of claim 5,
wherein the virtual filter is arranged at a position to allow filtering using the predetermined filter or the newly set filter to more closely approximate the true value.

11. The filter calibration method of claim 5,
wherein the setting of the virtual filter is repeated by changing a setting position of the virtual filter, until the mode is determined to be equal to or approximate to the true value.

12. The filter calibration method of claim 5,
wherein the at least one virtual filter is complementarily set around the predetermined filter or the newly set filter.

13. The filter calibration method of claim 5,
wherein the mode is determined to be equal to the true value.

14. The non-transitory computer readable medium of claim 6,
wherein the filtering is set for metadata indicating information relating to an object to be monitored, the metadata being output together with the video data by the monitoring image pickup apparatus.

15. The non-transitory computer readable medium of claim 6,
wherein the virtual filter is arranged at a position to allow filtering using the predetermined filter or the newly set filter to more closely approximate the true value.

16. The non-transitory computer readable medium of claim 6,
wherein the setting of the virtual filter is repeated by changing a setting position of the virtual filter, until the mode is determined to be equal to or approximate to the true value.

17. The non-transitory computer readable medium of claim 6,
wherein the at least one virtual filter is complementarily set around the predetermined filter or the newly set filter.

18. The non-transitory computer readable medium of claim 6,
wherein the mode is determined to be equal to the true value.

* * * * *